(12) United States Patent
Lin (10) Patent No.: US 6,517,299 B1
(45) Date of Patent: Feb. 11, 2003

(54) CUTTER HOLDER FOR CUTTING METAL-WORKING MACHINE

(76) Inventor: Yuan-Ho Lin, 206-12, Sec. 1, Kuo Kuang Rd., Ta Li City, Taichung Hsien (TW)

( * ) Notice: Subject to any disclaimer, the term of this patent is extended or adjusted under 35 U.S.C. 154(b) by 8 days.

(21) Appl. No.: 09/934,513

(22) Filed: Aug. 23, 2001

(51) Int. Cl.[7] .............................. B23C 5/26; B23B 51/00
(52) U.S. Cl. .................... 409/234; 409/233; 408/239 R
(58) Field of Search .......................... 82/158, 160, 161, 82/155; 279/81, 82, 63, 64, 65; 409/230, 231, 232, 233, 234; 408/239 R, 239 A, 240

(56) References Cited

U.S. PATENT DOCUMENTS

| | | | | |
|---|---|---|---|---|
| 4,571,132 A | * | 2/1986 | Bunge .......................... | 409/234 |
| 4,902,177 A | * | 2/1990 | Burnett ........................ | 409/234 |
| 5,593,258 A | * | 1/1997 | Matsumoto et al. ......... | 409/234 |
| 6,280,126 B1 | * | 8/2001 | Slocum et al. ............... | 409/141 |
| 6,315,506 B1 | * | 11/2001 | Mizoguchi ................... | 409/234 |
| 6,352,395 B1 | * | 3/2002 | Matsumoto et al. ......... | 409/234 |

FOREIGN PATENT DOCUMENTS

DE          3234057 A1 * 3/1984  ......... B23B/29/034

* cited by examiner

*Primary Examiner*—Henry Tsai
(74) *Attorney, Agent, or Firm*—Charles E. Baxley (57) ABSTRACT

A cutter holder comprises a coupling shaft, a driving shaft inserted into the coupling shaft, the driving shaft having toothed rails respectively engaged into corresponding radial slots of the coupling shaft, a driving nut mounted on the coupling shaft and meshed with the toothed rails of the driving shaft for enabling the driving shaft to be moved axially upon rotary motion of the driving nut; a retainer ring mounted on the coupling shaft and disposed in contact with the driving nut at one side, the retainer ring having a plurality of spring leaves radially arranged around the periphery thereof, a driving ring mounted around the coupling shaft and press-fitted onto the driving nut, the driving ring having retaining grooves for the positioning of the spring leaves of the retainer ring, and a chuck fastened to one end of the coupling shaft and adapted to hold down a cutter.

18 Claims, 9 Drawing Sheets

CUTTER HOLDER FOR CUTTING METAL-WORKING MACHINE

BACKGROUND OF THE INVENTION

The present invention relates to cutting metal-working machines and, more specifically, to a cutter holder for a cutting metal-working machine.

Regular cutting metal-working machines such as lathes, power drills, and etc., commonly have a cutter holder or chuck assembly adapted to hold the cutter in position, enabling the cutter to be rotated with the transmission shaft. A conventional cutter holder or chuck assembly for this purpose comprises a body, the body having a plurality of oblique slots provided around the periphery, a plurality of pawls respectively slidably mounted in the oblique slots of the body, and a driving ring controlled to move the pawls radially forwards/backwards to lock/release the cutter. This structure of cutter holder or chuck assembly cannot be used in a cutting metal-working machine that needs to rotate the cutter in the reversed direction, because it releases the chuck when rotated in the reversed direction.

SUMMARY OF THE INVENTION

The present invention has been accomplished under the circumstances in view. It is one object of the present invention to provide a cutter holder for cutting-metal working machine, which enables the cutter to be rotated with the transmission shaft of the cutting metal-working machine clockwise as well as counter-clockwise. It is another object of the present invention to provide a cutter holder for cutting metal-working machine, which imparts a positive clamping force to hold down the cutter for working. To achieve these and other objects of the present invention, the cutter holder cutter holder comprises a coupling shaft, a driving shaft inserted into the coupling shaft, the driving shaft having toothed rails respectively engaged into corresponding radial slots of the coupling shaft, a driving nut mounted on the coupling shaft and meshed with the toothed rails of the driving shaft for enabling the driving shaft to be moved axially upon rotary motion of the driving nut; a retainer ring mounted on the coupling shaft and disposed in contact with the driving nut at one side, the retainer ring having a plurality of spring leaves radially arranged around the periphery thereof, a driving ring mounted around the coupling shaft and press-fitted onto the driving nut, the driving ring having retaining grooves for the positioning of the spring leaves of the retainer ring, and a chuck fastened to one end of the coupling shaft and adapted to hold down a cutter.

BRIEF DESCRIPTION OF THE DRAWINGS

FIG. is an elevational assembly view of the cutter holder of the first embodiment of the present invention.

DETAILED DESCRIPTION OF THE PREFERRED EMBODIMENT

Referring to FIGS. from 1 through 6, a cutter holder in accordance with the present invention is shown comprising a coupling shaft 10, a driving shaft 20, a driving nut 30, a ball ring 40, a friction ring 41, a retainer ring 50, a driving ring 60, and a chuck, which is comprised of a body 70, a plurality of pawls 80, and a shell 90.

Figure 1:
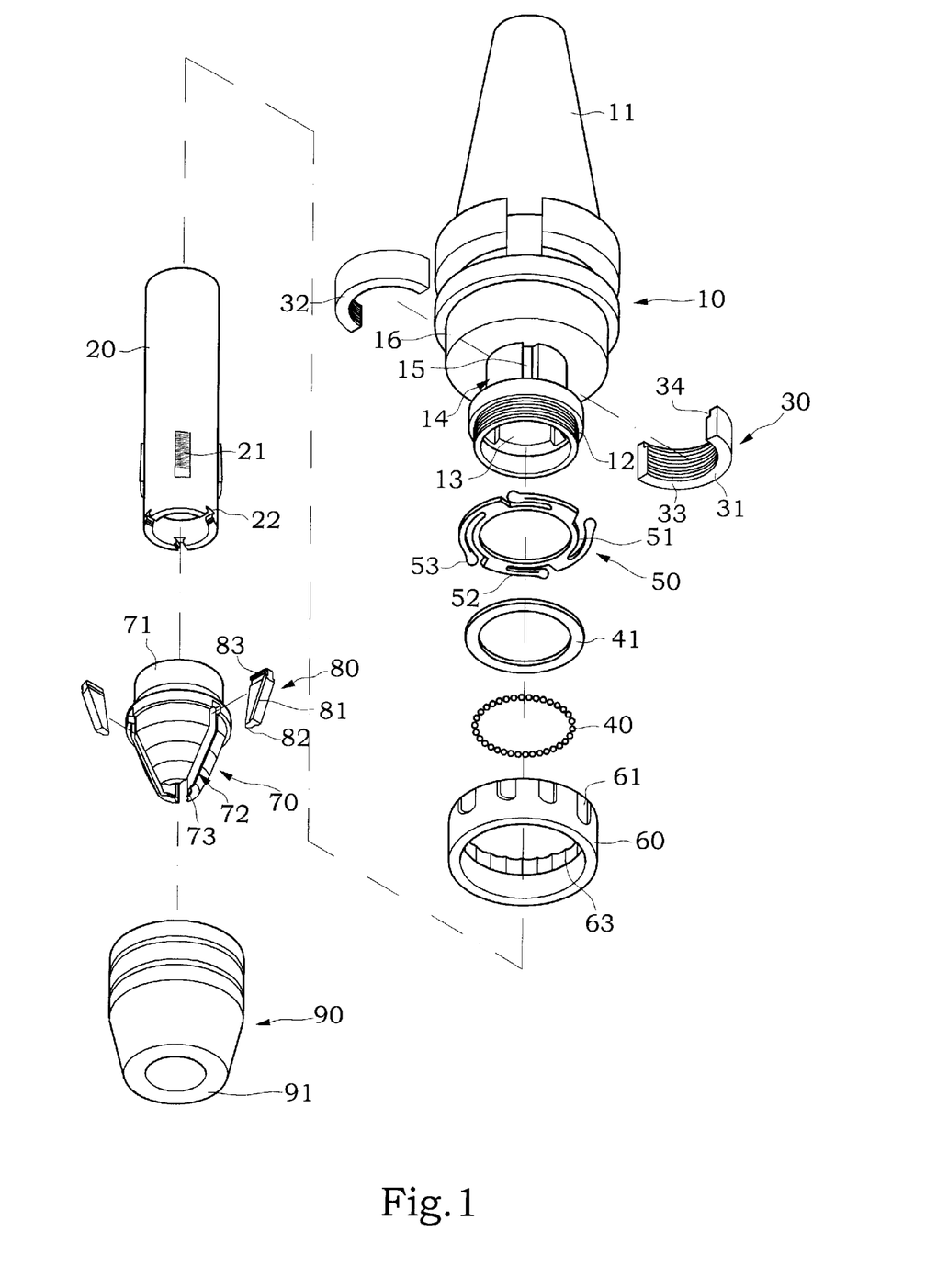
FIG. 1 is an exploded view of a cutter holder according to a first embodiment of the present invention.
Figure 2:
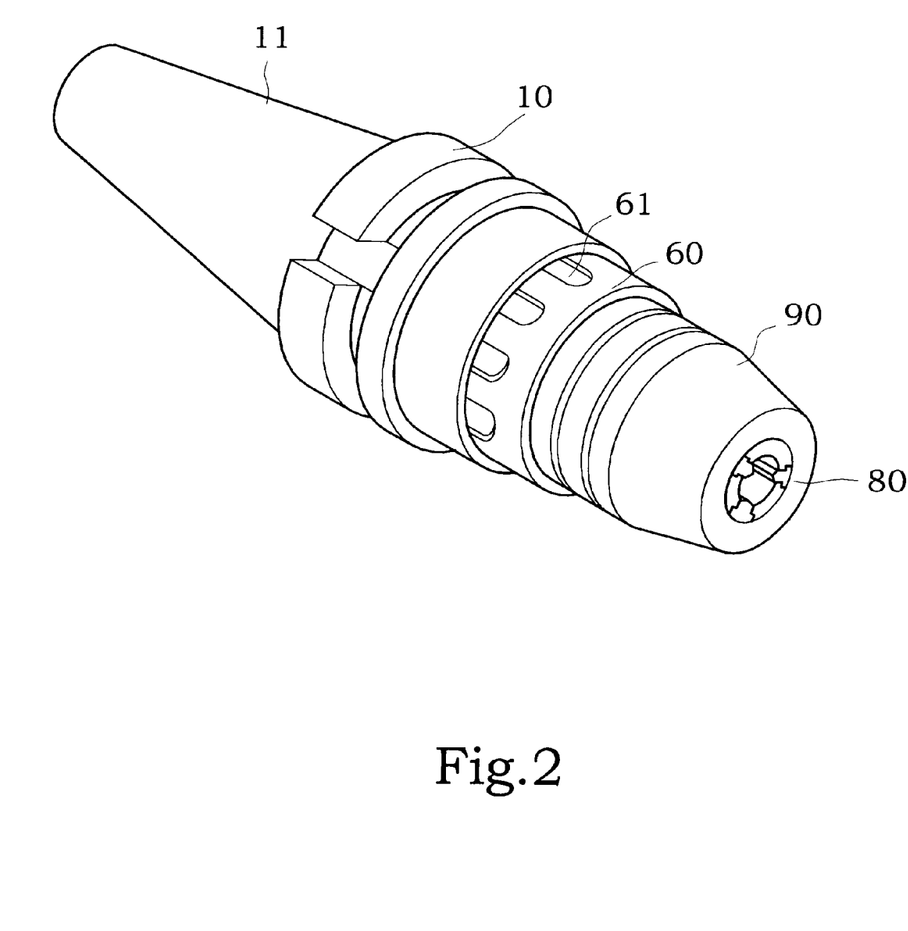
Figure 3:
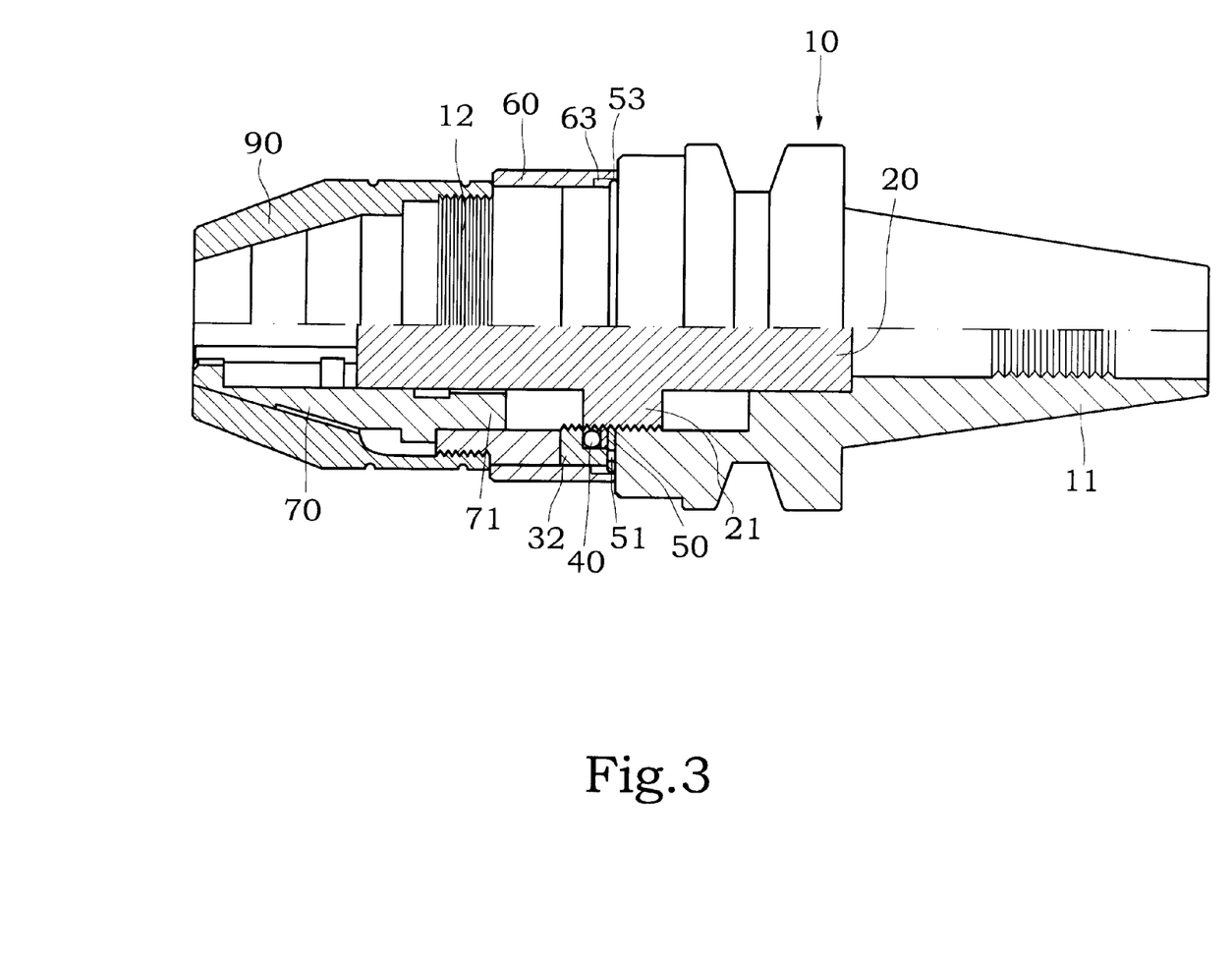
FIG. 3 is a sectional assembly view of the cutter holder of the first embodiment of the present invention (I).
Figure 4:
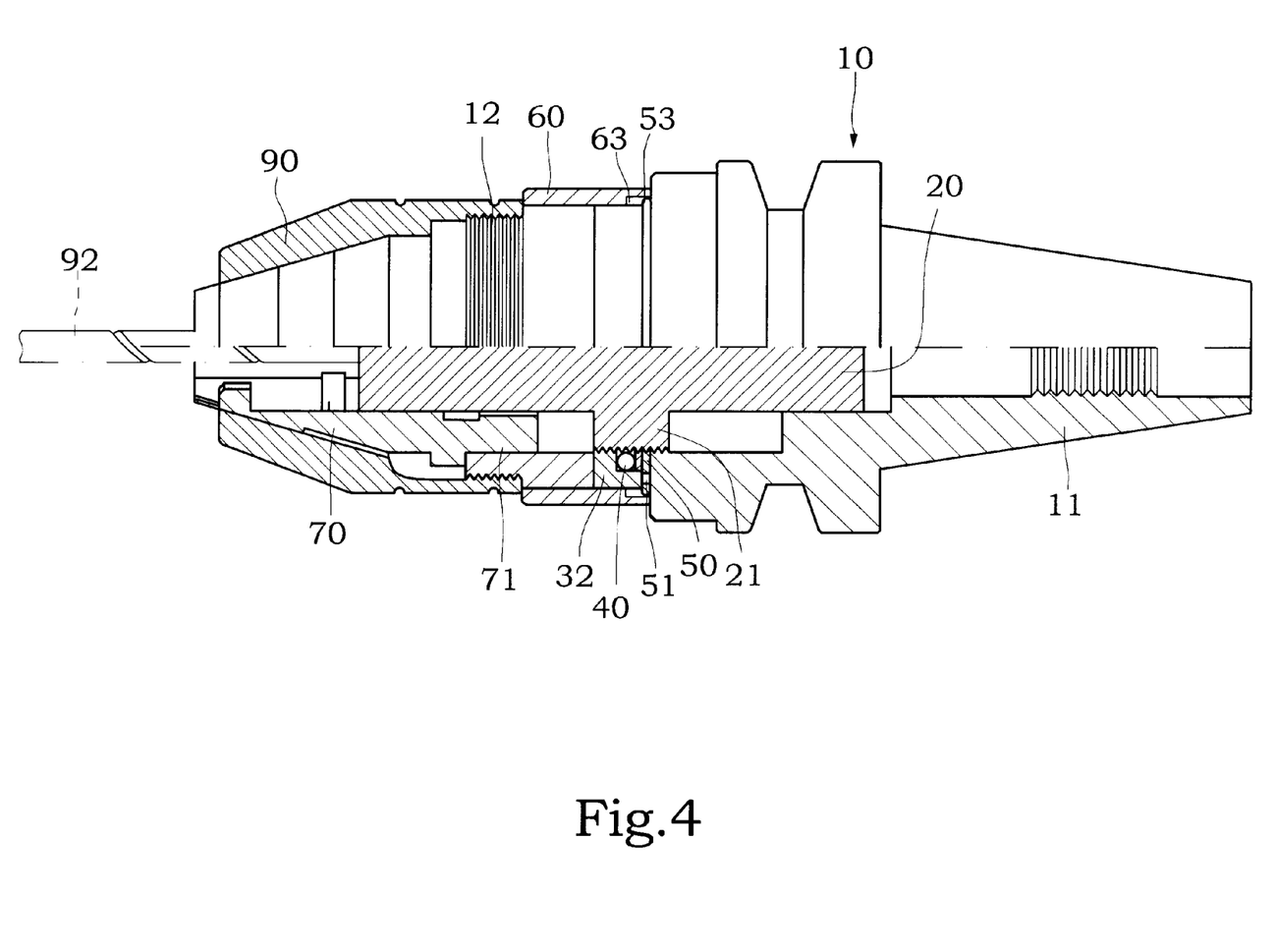
FIG. 4 is a sectional assembly view of the cutter holder of the first embodiment of the present invention (II).
Figure 5:
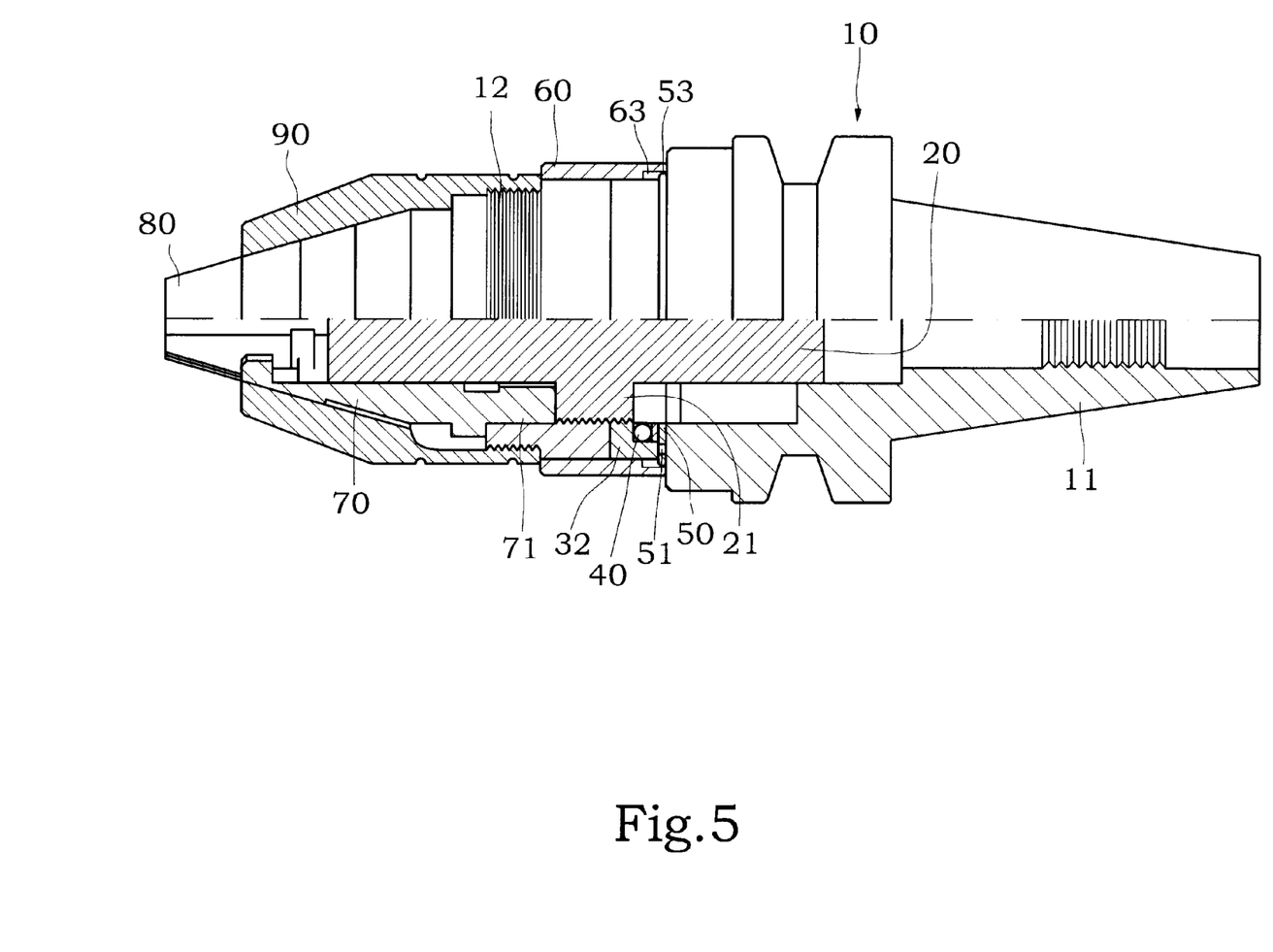
FIG. 5 is a sectional assembly view of the cutter holder of the first embodiment of the present invention (III).
Figure 6:
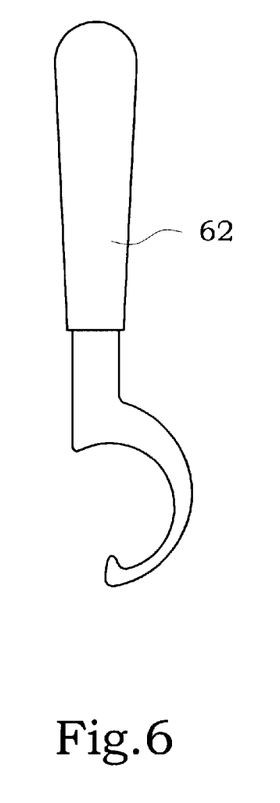
FIG. 6 illustrates a spanner for use with the cutter holder according to the present invention.

The coupling shaft 10 comprises a tapered rear coupling portion 11 for fastening to the tool holder rack of the cutting metal-working machine (not shown), an externally threaded front coupling portion 12, an axially extended center through hole 13, a shoulder 16, a neck 14 axially connected between the front coupling portion 12 and the shoulder 16, and a plurality of slots 15 radially extended through the neck 14. The outer diameter of the tapered rear coupling portion 11 gradually reduces from the shoulder 16 toward the rear end of the coupling shaft 10. The axially extended center through hole 13 of the coupling shaft 10 has a narrow diameter section corresponding to the neck 14. The driving shaft 20 is inserted into the axially extended center through hole 13 of the coupling shaft 10, comprising a plurality of toothed rails 21 corresponding to the slots 15 of the coupling shaft 10, and a plurality of retaining notches 22 equiangularly spaced around the front end thereof. The driving nut 30 is comprised of two symmetrical halves 31;32, each having threads 33 on the respective inside wall and a locating groove 34 at one end. The two symmetrical halves 31;32 are mounted on the neck 14 of the coupling shaft 10 and abutted against each other, keeping the threads 33 meshed with the toothed rails 21 of the driving shaft 20. The ball ring 40 is mounted in the locating groove 34 of each of the symmetrical halves 31;32 of the driving nut 30. The friction ring 41 is mounted in the locating groove 34 of each of the symmetrical halves 31;32 of the driving nut 30 to hold the ball ring 40 in place. The retainer ring 50 is mounted on the neck 14 of the coupling shaft 10 and stopped between the shoulder 16 of the coupling shaft 10 and the friction ring 41, having a plurality of spirally extended peripheral notches 51 and a plurality of spring leaves 52 respectively suspending in the peripheral notches 51. The spring leaves 52 each have a free end terminating in a protruding portion 53. The driving ring 60 is mounted around the coupling shaft 10 is tightly fitted onto the driving nut 30, having a plurality of tool recesses 61 around the outside wall thereof near one end for the positioning of a spanner 62 being used to rotate the driving ring 60 (also FIG. 6), and a plurality of retaining grooves 63 around the inside wall thereof for the positioning of the protruding portions 53 of the retainer ring 50. The body 70 is a conical sleeve having a rear coupling portion 71 press-fitted into the externally threaded front coupling portion 12 of the coupling shaft 10, a plurality of longitudinal splits 72 corresponding to the retaining notches 22 of the driving shaft 20, and a plurality of longitudinal guide grooves 73 respectively disposed on the inside along two sides of each of the longitudinal splits 72. The pawls 80 are respectively inserted in the longitudinal splits 72 of the body 70, each comprising a hooked portion 83 disposed at one end and hooked in one retaining notch 22 of the driving shaft 20, a rail 81 coupled to one longitudinal guide groove 73 of the body 70, and an engagement face 82 adapted to engage the cutter 92. The shell 90 is a hollow conical shell threaded onto the threaded second coupling portion 12 of the coupling shaft 10, having a tapered center through hole 91 fitting the conical periphery of the body 70.

When installing the cutter 92, use the spanner 62 to rotate the driving ring 60. Because the driving ring 60 fits the periphery of the driving nut 30 tightly, rotating the driving ring 60 causes the driving nut 30 to be rotated with the driving ring 60. Because the driving nut 30 is meshed with the toothed rails 21 of the driving shaft 20, the driving shaft 20 is moved axially forwards toward the shell 90 upon rotary motion of the driving nut 30, and at the same time the pawls 80 are moved forwards with the driving shaft 20. During forward movement of the pawls 80, the pawls 80 are simultaneously radially forced inwards by the periphery of the tapered center through hole 91 of the shell 90 against the periphery of the cutter 92. Because the retaining grooves 63 of the driving ring 60 are engaged with the protruding portions 53 of the retainer ring 50, the retainer ring 50 is rotated with the driving ring 60 during rotary motion of the driving ring 60. However, when the driving shaft 20 is moved axially forwards toward the shell 90, the driving nut 30 imparts a force to the ball ring 40 and the friction ring 41 in direction against the retainer ring 50. Therefore, the ball ring 40 and the friction ring 41 hold down the retainer ring 50 when the pawls 80 engage the cutter 92 firmly, and the retainer ring 50 is free from rotary motion of the driving ring 60 at this time. If the user continuously turns the spanner 62 at this time, the driving ring 60 will be forced to move the retaining grooves 63 over the protruding portions 53 and to force protruding portions 53 radially inwards. When the retaining grooves 63 are moved into alignment with the protruding portions 53 again, the protruding portions 53 are immediately forced outwards by the spring power of the respective spring leaves 52 into engagement with the retaining grooves 63 again, and at this time a click sound is produced. The presence of the click sound means that the driving ring 60 has been fastened tight, and the cutter 92 has been locked in between the pawls 80. Thus, the user can start the cutting metal-working machine to rotate the coupling shaft 10.

Because the toothed rails 21 of the coupling shaft 20 are respectively engaged into the slots 15 of the coupling shaft 10 and because the retaining notches 22 of the driving shaft 20 are respectively engaged with the hooked portion 83 of each of the pawls 80, the body 70 and the driving shaft 20 are rotated with the coupling shaft 10 when starting the cutting metal-working machine to rotate the coupling shaft 10 clockwise. Because the driving nut 30 is meshed with the toothed rails 21 of the driving shaft 20 and because the driving ring 60 is press-fitted onto the driving nut 30, the driving nut 30 and the driving ring 60 are rotated with the driving shaft 20 upon rotary motion of the driving shaft 20. Because the protruding portions 53 of the retainer ring 50 are respectively engaged into the retaining grooves 63 of the driving ring 60, the retainer ring 50 is rotated with the driving ring 60 upon rotary motion of the driving ring 60. On the contrary, when reversing the coupling shaft 10, the cutter 92 is rotated in the reversed direction.

When loosening the pawls 80 to release the cutter 92, use the spanner 62 to rotate the driving ring 60 in the reversed direction. At the initial stage, the ball ring 40 still holds down the retainer ring 50, and a click sound is produced during movement of the protruding portions 53 of the retainer ring 50 over the retaining grooves 63 of the driving ring 60. However, when the driving ring 60 drives the driving nut 30 to rotate and to further move the driving shaft 20 axially backwards the driving nut 30 is forced to produce a reversed reactive force, and therefore the ball ring 40 and the friction ring 41 are released from the retainer ring 50. At this time, the rotary motion of the driving ring 60 drives the retainer ring 50 to rotate, and the backward movement of the driving shaft 20 drives the pawls 80 to move backwards along the splits 72 of the body 70, and therefore the pawls 80 are released from the cutter 92. During backward movement of the driving shaft 20, the relatively bigger diameter section of the axially extended center through hole 13 of the coupling shaft 11 provides a receiving space for the toothed rails 21, and the smallest diameter section of the axially extended center through hole 13 of the coupling shaft 1 limits the distance of the backward movement of the driving shaft 20.

Figure 7:
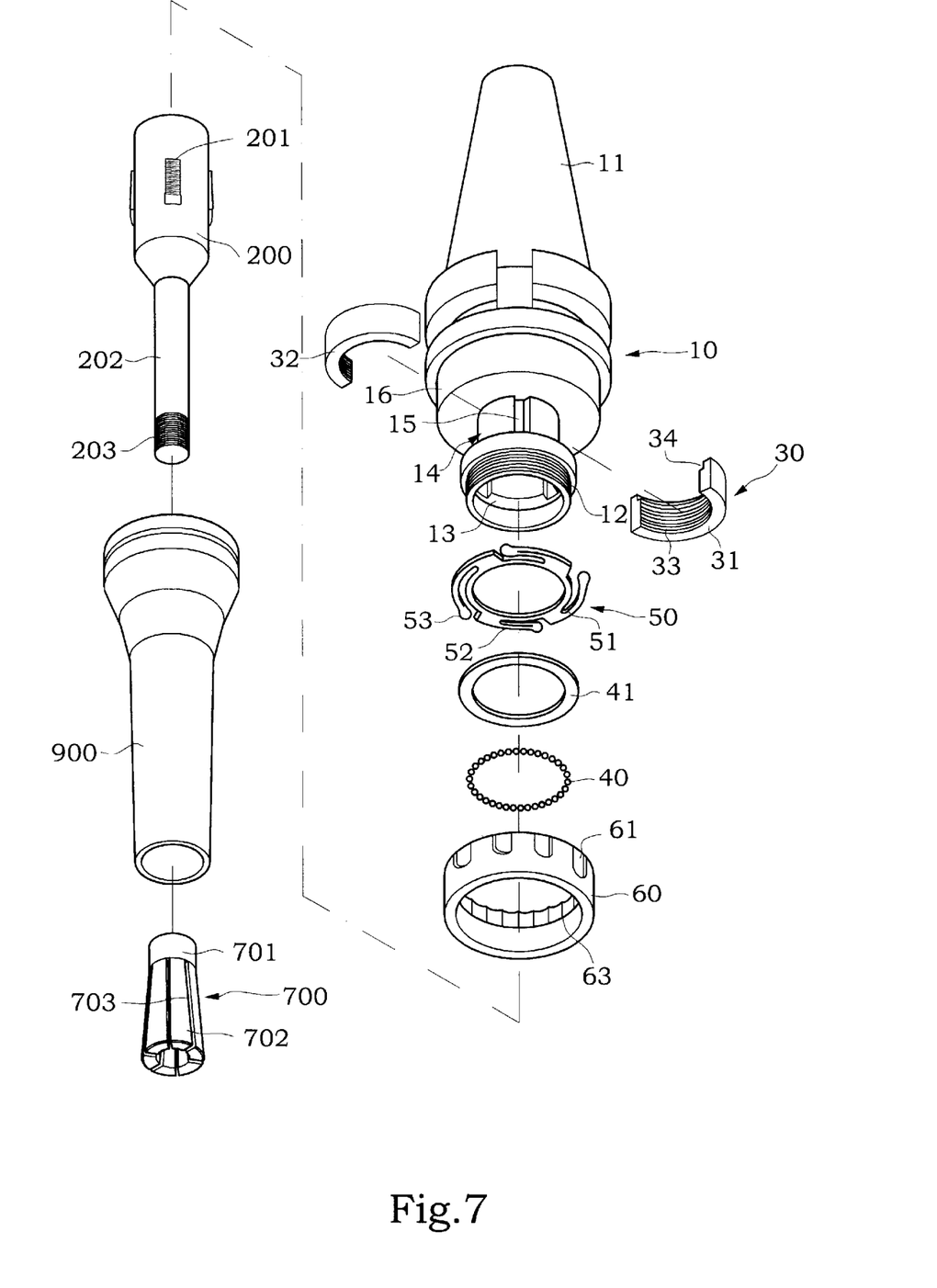
FIG. 7 is an exploded view of a cutter holder according to a second embodiment of the present invention.
Figure 8:
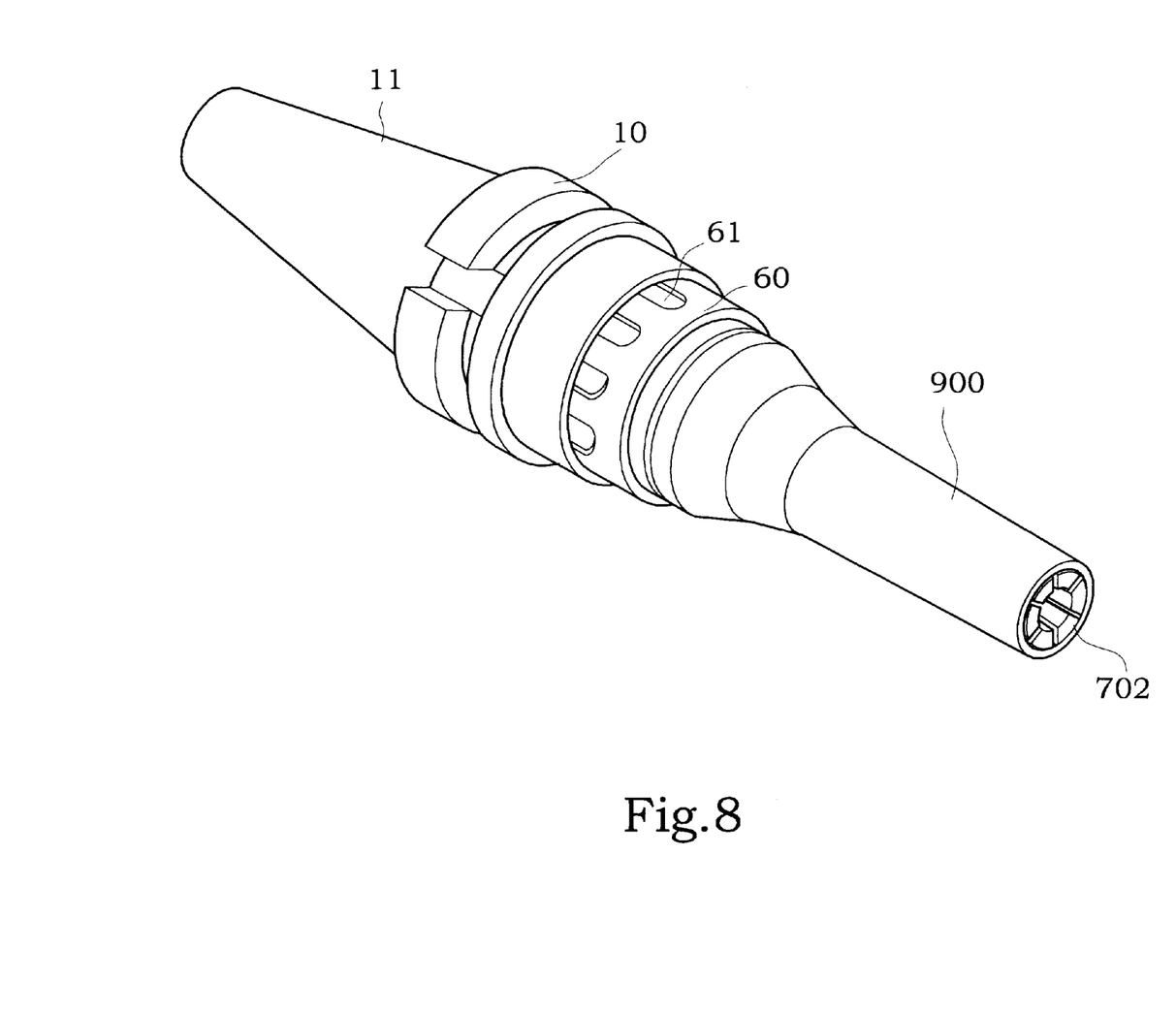
FIG. 8 is an elevational assembly view of the cutter holder according to the second embodiment of the present invention.
Figure 9:
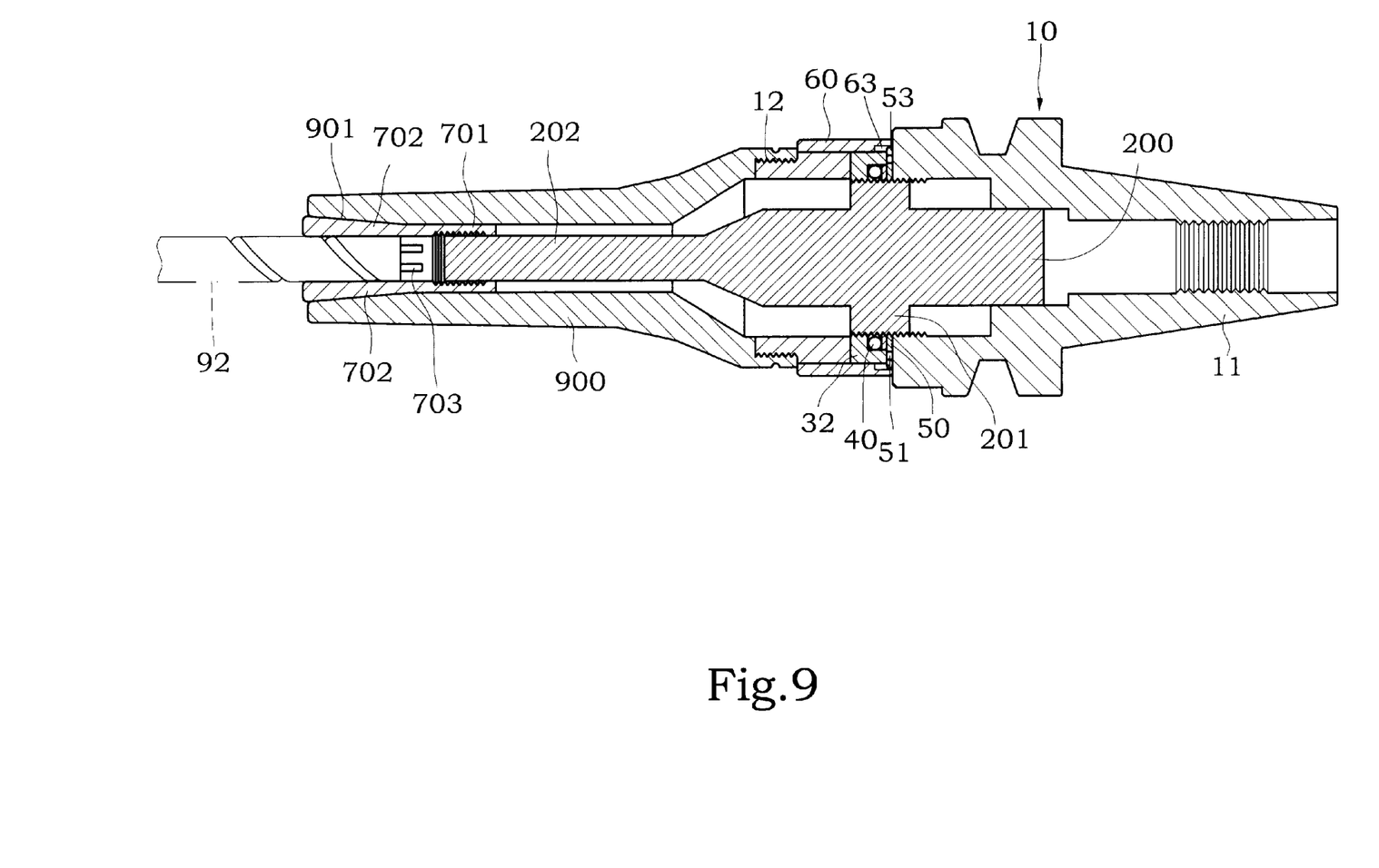
FIG. 9 is a sectional assembly view of the cutter holder according to the second embodiment of the present invention.

FIGS. from 7 through 9 show an alternate form of the cutter holder. According to this alternate form, the cutter holder comprises a coupling shaft 10, a driving shaft 200, a driving nut 30, a ball ring 40, a retainer ring 50, a driving ring 60, a shell 900, and a cutter clamp 700. The structural features and functions of the coupling shaft 10, the driving nut 30, the ball ring 40, the retainer ring 50, and the driving ring 60 are same as the aforesaid first embodiment of the present invention. The driving shaft 200 comprises a plurality of toothed rails 201 provided around the periphery and respectively engaged into the slots 15 of the coupling shaft 10, and a front extension rod 202 of reduced outer diameter. The front extension rod 202 has a threaded front end 203. The cutter clamp 700 comprises a nut 701 threaded onto the threaded front end 203 of the driving shaft 200, and a plurality of clamping strips 702 longitudinally extended from one side of the nut 701 and equiangularly spaced from one another by gaps 703. The clamping strips 702 define an axially extended center hole for receiving the cutter 92. The shell 900 is a cylindrical hollow shell threaded onto the externally threaded front coupling portion 12 of the coupling shaft 10, having a tapered center through hole 901, which receives the cutter clamp 700.

When in use, the cutter 92 is inserted into the cutter clamp 700, and then the spanner 62 is operated to rotate the driving ring 60. When rotating the driving ring 60, the driving nut 30 is forced to move the driving shaft 200 axially forwards (or backwards), thereby causing the cutter clamp 700 to be moved with the driving shaft 200 axially forwards (or backwards) relative to the shell 900. When moving the cutter clamp 700 axially backwards, the clamping strips 702 are forced radially inwards by the tapered center through hole 901 of the shell 900 against the periphery of the cutter 92, and therefore the cutter 92 is positively secured to the cutter clamp 700. On the contrary, when moving the cutter clamp 700 axially forwards, the clamping strips 702 are released from the cutter 92, enabling the cutter 92 to be removed from the cutter clamp 700.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cutter holder comprising:
 a coupling shaft fastened to the cutter holder rack of a cutting metal-working machine, said coupling shaft comprising an axially extended center through hole, a neck, and a plurality of slots radially extended through said neck;

a driving shaft inserted into the axially extended center through hole of said coupling shaft, said driving shaft comprising a plurality of toothed rails equiangularly spaced around the periphery thereof and respectively engaged into the slots of said coupling shaft;

a driving nut formed of two symmetrical halves abutted against each other around said neck of said coupling shaft and meshed with the toothed rails of said driving shaft for enabling said driving shaft to be moved axially in said coupling shaft upon rotary motion of said driving nut;

a retainer ring mounted on said neck of said coupling shaft and disposed in contact with said driving nut at one side, said retainer ring comprising a plurality of spring leaves radially arranged around the periphery thereof;

a driving ring mounted around said coupling shaft and press-fitted onto the periphery of said driving nut; and a chuck fastened to one end of said coupling shaft and adapted to hold down a cutter.

2. The cutter holder as claimed in claim 1 wherein said driving nut comprises a locating groove extended around one end thereof, which receives a ball ring.

3. The cutter holder as claimed in claim 2 further comprising a friction ring mounted in said locating groove of said driving nut to hold said ball ring in place.

4. The cutter holder as claimed in claim 1 wherein said retainer ring comprises a plurality of spirally extended peripheral notches, and said spring leaves of said retainer ring are respectively suspended in said spirally extended peripheral notches.

5. The cutter holder as claimed in claim 4 wherein said spring leaves of said retainer ring each have a free end terminating in a protruding portion.

6. The cutter holder as claimed in claim 5 wherein said driving ring comprises a plurality of retaining grooves spaced around an inside wall thereof adapted to receive the protruding portions of said retainer ring.

7. The cutter holder as claimed in claim 1 wherein the axially extended center through hole of said coupling shaft has a reduced diameter section corresponding to said neck.

8. The cutter holder as claimed in claim 1 wherein said driving ring comprises a plurality of tool recesses around an outside wall thereof for the positioning of a spanner to be used to rotate said driving ring.

9. A cutter holder comprising:

a coupling shaft fastened to the cutter holder rack of a cutting metal-working machine, said coupling shaft comprising an axially extended center through hole, a neck, and a plurality of slots radially extended through said neck;

a driving shaft inserted into the axially extended center through hole of said coupling shaft, said driving shaft comprising a plurality of toothed rails equiangularly spaced around the periphery thereof and respectively engaged into the slots of said coupling shaft, and a front extension rod;

a driving nut formed of two symmetrical halves abutted against each other around said neck of said coupling shaft and meshed with the toothed rails of said driving shaft for enabling said driving shaft to be moved axially in said coupling shaft upon rotary motion of said driving nut;

a retainer ring mounted on said neck of said coupling shaft and disposed in contact with said driving nut at one side, said retainer ring comprising a plurality of spring leaves radially arranged around the periphery thereof;

a driving ring mounted around said coupling shaft and press-fitted onto the periphery of said driving nut;

a cutter clamp adapted to hold down a cutter, said cutter clamp having a plurality of equiangularly spaced clamping strips; and a shell fastened to one end of said coupling shaft and suspended around said driving nut, said retainer ring, said driving ring, and said driving shaft, said shell having a tapered center through hole, which receives said cutter clamp for enabling said clamping strips to be radially compressed inwards against the cutter being inserted into said cutter clamp when said cutter clamp is moved with said driving shaft axially backwards upon rotary motion of said driving nut.

10. The cutter holder as claimed in claim 9 wherein said driving nut comprises a locating groove extended around one end thereof, which receives a ball ring.

11. The cutter holder as claimed in claim 9 further comprising a friction ring mounted in said locating groove of said driving nut to hold said ball ring in place.

12. The cutter holder as claimed in claim 11 wherein said retainer ring comprises a plurality of spirally extended peripheral notches, and said spring leaves of said retainer ring are respectively suspended in said spirally extended peripheral notches.

13. The cutter holder as claimed in claim 9 wherein said spring leaves of said retainer ring each have a free end terminating in a protruding portion.

14. The cutter holder as claimed in claim 13 wherein said driving ring comprises a plurality of retaining grooves spaced around an inside wall thereof adapted to receive the protruding portions of said retainer ring.

15. The cutter holder as claimed in claim 9 wherein said coupling shaft comprises an externally threaded front coupling portion, and said shell has one end internally threaded and threaded onto the externally threaded front coupling portion of said coupling shaft.

16. The cutter holder as claimed in claim 9 wherein the axially extended center through hole of said coupling shaft has a reduced diameter section corresponding to said neck.

17. The cutter holder as claimed in claim 9 wherein said driving ring comprises a plurality of tool recesses around an outside wall thereof for the positioning of a spanner to be used to rotate said driving ring.

18. The cutter holder as claimed in claim 9 wherein the front extension rod of said driving shaft has a threaded front end, and said cutter clamp has a nut fixedly connected to one end of each of said clamping strips and threaded onto the threaded front end of said driving shaft.

* * * * *